United States Patent
Hashmi et al.

(10) Patent No.: US 10,498,529 B1
(45) Date of Patent: Dec. 3, 2019

(54) SCALABLE NODE FOR SECURE TUNNEL COMMUNICATIONS

(71) Applicant: AMAZON TECHNOLOGIES, INC., Seattle, WA (US)

(72) Inventors: Omer Hashmi, Chevy Chase, MD (US); Bashuman Deb, Aldie, VA (US)

(73) Assignee: Amazon Technologies, Inc., Seattle, WA (US)

( * ) Notice: Subject to any disclaimer, the term of this patent is extended or adjusted under 35 U.S.C. 154(b) by 420 days.

(21) Appl. No.: 15/369,325

(22) Filed: Dec. 5, 2016

(51) Int. Cl.
*H04L 9/08* (2006.01)
*H04L 29/06* (2006.01)
*G06F 9/455* (2018.01)
*H04L 9/14* (2006.01)

(52) U.S. Cl.
CPC ........ *H04L 9/0827* (2013.01); *G06F 9/45558* (2013.01); *H04L 9/14* (2013.01); *H04L 63/029* (2013.01); *H04L 63/0272* (2013.01); *H04L 63/068* (2013.01); *G06F 2009/45587* (2013.01); *G06F 2009/45595* (2013.01)

(58) Field of Classification Search
CPC ....... H04L 9/0827; H04L 63/068; H04L 9/14; H04L 63/029; H04L 63/0272; G06F 9/45558; G06F 2009/45595; G06F 2009/45587
USPC ........................................................ 713/160
See application file for complete search history.

(56) References Cited

U.S. PATENT DOCUMENTS

| | | | | |
|---|---|---|---|---|
| 8,811,223 | B2* | 8/2014 | Kanekar | H04L 63/166 370/254 |
| 2001/0005853 | A1* | 6/2001 | Parkes | G06F 9/4843 718/106 |
| 2003/0191781 | A1* | 10/2003 | Civanlar | H04L 29/12009 |
| 2011/0150223 | A1* | 6/2011 | Qi | H04W 12/04 380/273 |
| 2012/0084262 | A1* | 4/2012 | Dwarampudi | G06F 11/1448 707/667 |
| 2015/0363219 | A1* | 12/2015 | Kasturi | H04L 41/5058 718/1 |
| 2017/0033924 | A1* | 2/2017 | Jain | H04L 9/0819 |
| 2018/0097785 | A1* | 4/2018 | Yang | H04L 63/061 |

* cited by examiner

*Primary Examiner* — Mohammed Waliullah
(74) *Attorney, Agent, or Firm* — Blank Rome LLP

(57) ABSTRACT

A virtual private network (VPN) endpoint node is implemented on multiple virtual machines in a provider network. One or more virtual machines execute a packet aggregator. One or more other virtual machines implement cryptographic units. The packet aggregator is configured to distribute incoming encrypted packets from a secure tunnel across the plurality of cryptographic units. Each cryptographic unit is configured to decrypt incoming encrypted packets from the packet aggregator and to encrypt outgoing plaintext packets for transmission across the secure tunnel. The packet aggregator also may assign a sequence number to an outgoing plaintext packet, create a tunneled packet including the sequence number in a header of the tunneled packet and including the plaintext packet in tunneled packet, select one of the cryptographic units, and forward the tunneled packet to the selected cryptographic unit.

18 Claims, 6 Drawing Sheets

SCALABLE NODE FOR SECURE TUNNEL COMMUNICATIONS

BACKGROUND

Numerous protocols exist for facilitating communications across computer networks. Some protocols, such as Internet Protocol Security (IPSec), include encryption functionality to protect the data. IPSec, for example, is a protocol suite for secure Internet Protocol (IP) communications that authenticates and encrypts each packet of a communication session. A packet is encrypted at one end of the communication tunnel, transmitted across the tunnel, and decrypted at the destination end of the tunnel. The encryption and decryption of packets is performed bi-directionally.

Encrypting and decrypting packets takes time and can be a primary bottleneck in the communication process, particularly for software-based encryption and decryption solutions that execute on general purpose computers. Further, many network implementations benefit from increased traffic rates which places continued pressure on the encryption/decryption parts of the communication protocols.

BRIEF DESCRIPTION OF THE DRAWINGS

For a detailed description of various examples, reference will now be made to the accompanying drawings in which.

DETAILED DESCRIPTION

Figure 1:
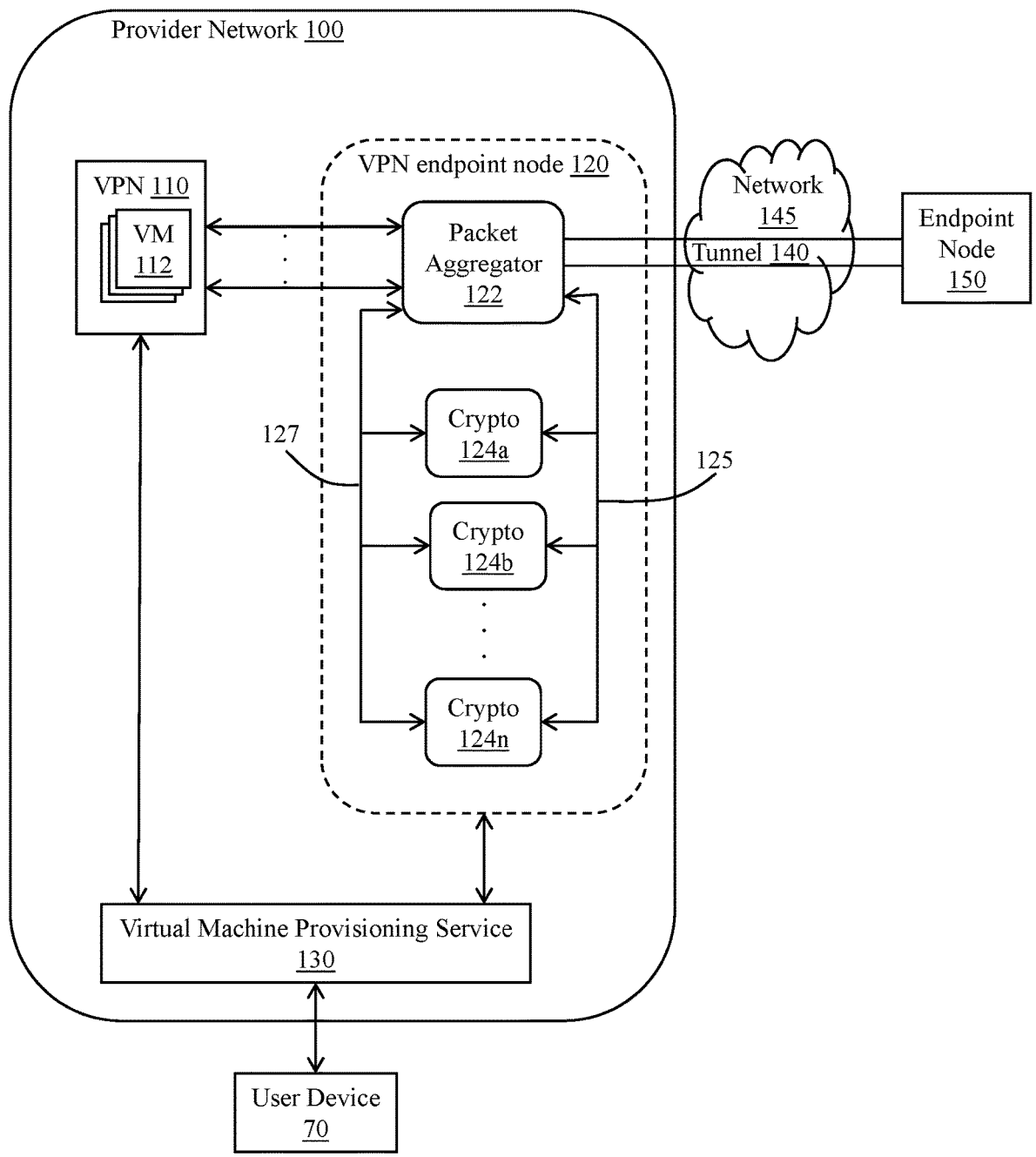
FIG. 1 shows a system including a virtual private network endpoint node, which includes a packet aggregator and multiple cryptographic units in accordance with various examples.

The embodiments described herein decouple the packet forwarding and cryptographic operations. The term "cryptographic" (sometimes called "crypto") refers to either or both of the encryption process and the decryption process. By decoupling the cryptographic operations from the underlying packet forwarding functions, individual cryptographic units (which may execute on separate host computers from the packet forwarding nodes) can be added to the system and operated in parallel. By parallelizing multiple cryptographic units, multiple packets can be encrypted and/or decrypted concurrently thereby increasing the overall data rate through the cryptographic part of the communication protocol.

Some embodiments are directed to a provider network that includes multiple compute devices such as server computers (also referred to as "host computers') on which virtual machines may execute. Customers of the service provider can interact with various management services of the provider network to have the provider network launch and execute one or more virtual machines on behalf of the customers. The customers may execute one or more applications within their respective virtual machines to perform tasks specific to each such customer.

One of the management services available to the customers permits a customer to request the creation of a node that implements a security protocol such as IPSec. The node may be communicatively coupled to one or more virtual machines of the customer to permit secure encrypted communications on behalf of such customer virtual machine(s) to a destination network. The node comprises multiple software components executing within virtual machines which themselves execute on compute devices. The software components may implement a packet aggregator and one or more cryptographic applications (also called cryptographic units or crypto units). In one example in which a node comprises four crypto units, the node may include five virtual machines, each executing on a separate compute devices. The packet aggregator executes as one of the virtual machines and each of the four crypto units executes as its own virtual machine on separate compute devices. The number of crypto units within the node may be determined in a number of ways such as by selection by the customer as part of the launch request for the node or determined based on traffic rate data specified by the customer as part of the launch request. Further, the node may be scalable in that the number of crypto units may be dynamically altered during run-time of the node based on a detected change in the rate of packets through the node.

In one embodiment, the packet aggregator may be implemented as an application executing within a single virtual machine. In another embodiment, the packet aggregator may be implemented as multiple applications, each executing within a different virtual machine. In the latter case, the packet aggregation function may be implemented as a "north aggregator" and a "south aggregator" implemented as two separate virtual machines. For inbound traffic (traffic from the destination network to the customer's virtual machine executing within the provider network), the north aggregator in some implementations is configured to receive encrypted packets from a destination network, apply anti-replay logic to the incoming encrypted packets, and distribute incoming encrypted packets across the various crypto units. The crypto units decrypt the encrypted packets distributed to them, and the south aggregator upon receive of the decrypted packets reorders, if appropriate, the received decrypted packets and forwards the reordered decrypted packets to the customer's virtual machine. In some embodiments, packets may be reordered by the south aggregator based on the sequence number in the packets' transmission control protocol (TCP) headers. In other embodiments, packet reordering may be based on the sequence number included in encrypted packets' encapsulation security payload (ESP) headers.

For outbound traffic (from the customer's virtual machine to the destination network), the south aggregator receives plaintext packets from the customer's virtual machine, assigns a sequence number (in accordance with, for example, the IPSec protocol), selects a crypto unit, and forwards the plaintext packet to the selected crypto node. The selected crypto node encrypts the packet and forwards the encrypted packet to the north aggregator for transmission across the secure tunnel to the destination network.

The secure tunnel between the north aggregator and the destination network may include the use of secure keys such as an encryption key to encrypt and decrypt packets. Some security protocols such as IPSec include the periodic changing of the keys. The IPSec protocol, for example, includes the use of a Phase I Diffie-Hellman key and a Phase II IPsec encryption key. Both keys are periodically recomputed, albeit at separately configurable rates. Key recomputation may include interaction between the two entities on opposite ends of the secure tunnel. In accordance with some embodiments, the north aggregator performs the key recomputation process and distributes any newly computed security keys such as encryption keys to the various crypto units for their subsequent use in encrypting and decrypting packets.

In the embodiment in which a single packet aggregator is implemented instead of separate north and south aggregators, the single packet aggregator may perform some or all of the functionality described above for the north and south aggregators.

In some embodiments, the provider network permits customers to request the creation of a virtual private network (VPN) endpoint (VPNe) node and to then connect the VPN endpoint node to a virtual private network which includes one or more of the customers' virtual machines. The VPNe node created for the customer includes the packet aggregator and the cryptographic units noted above. A customer can then cause a secure tunnel to be established between the VPN endpoint node (and thus the customer's virtual private network) and a remote node such as another VPN endpoint node, a networking device such as a gateway on the customer's premise, etc. A destination network may be attached to the remote node.

FIG. 1 shows an example of an embodiment in which the aggregator comprises an individual packet aggregator. This example includes a provider network 100, which includes one or more virtual private networks (VPNs) 110, one or more VPN endpoint nodes 120, and virtual machine provisioning service 130. The provider network 100 includes multiple host computers on which one or more virtual machines can be loaded and executed. Communications may be established between entities within the provider network and remote nodes over a public network. In the example of FIG. 1, communication connectivity is illustrated to a remote node 150 over a network 145. The network 145 may comprise a public network and comprise any one or more of wide area networks, local area networks, wired networks, wireless networks, etc.

The remote node 150 may comprise a single computer or a collection of computers networked together. In some embodiments, the remote node 150 may comprise a gateway on the customer's own premises, another VPN 110 implemented within the same or a different provider network 100, etc.

Each VPN 110 may comprise one or more virtual machines 112 that have been launched on host computers for use by the customer. A virtual machine is a software implementation of a physical computer system. Virtual machines may provide for multiple and/or different operating system environments to run concurrently on a single host computer. In one example, multiple virtual machines of a Linux® operating system environment may execute concurrently with multiple instances of a Microsoft® Windows® operating system environment on a single physical computer. A virtual machine may interact with a hypervisor or a virtual machine monitor (or other type of virtualization system) which are programs that execute on the physical computer that allow multiple guest operating systems to share a single hardware host. Each operating system appears to have exclusive access to the host's processor, memory, and other resources. However, the hypervisor controls the host processor and resources, allocating resources that are needed to each instance's operating system in turn and making sure that the guest operating systems of the virtual machines do not disrupt each other. Each virtual machine may be controlled by a respective customer.

The virtual machines created by the customer can be loaded by the customer with whatever customer-specific applications the customer so chooses. For example, the customer's applications may comprise web server applications, data processing applications, or any other type of functionality that the customer desires. The applications executing within the VPN endpoint virtual machines may be pre-stored in the machine images used to boot such virtual machines or may be loaded into the virtual machines post-boot by the provisioning service.

A virtual network comprises a logical grouping of virtual machines. A VPN 110 for a customer may be implemented over one or more intermediate physical networks that interconnect host computers on which the customer's virtual machines execute. That is, a virtual network may be implemented over a physical network. Each customer may have their instances operating within a virtual network. A virtual network uses virtual IP addresses and corresponding physical IP addresses. The implementation of a virtual network may include modifying or adding additional headers to packets to map virtual addresses consistent with the virtual network to physical addresses associated with the underlying physical network so that the packets can be routed through the physical network between host computers. Each of the host computers that implement the customer's VPN may include a communication manager that may modify outgoing packets destined for a virtual IP address of another virtual machine within the customer's virtual private network based on the physical IP addresses used within provider network. For example, if a communication packet is to be sent between computing nodes in the service provider's network, the originating packet may include an IP address in accordance with a particular protocol (e.g., IPv4), and a virtual machine communication manager associated with the sending host computer embeds the virtual network packet into a substrate network packet which includes physical source and destination IP addresses. The virtual machine communication manager then transmits the packet through an internal network (e.g., switches, routers, etc.) of the provider network. A virtual machine communication manager associated with the receiving host computer receives the substrate packet, extracts the virtual network packet and forwards the virtual network packet on to the targeted virtual machine.

A mapping service may be provided to store, update and provide virtual-to-physical address mappings for use in modifying packets to be transmitted between virtual machines in a virtual private network. The virtual network may be implemented in various ways in various embodiments, such as by using IPv4 ("Internet Protocol version 4") or IPv6 ("Internet Protocol version 6") packets as the overlay network packet size. For example, virtual network address information for a virtual network could be embedded in a larger physical packet network address space used for a networking protocol of the one or more intermediate physical networks. As one illustrative example, a virtual network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions, or otherwise modifying such data transmissions to translate them from a first networking protocol for which they are configured to a distinct second networking protocol.

In other embodiments IPv4 packets could be used by the physical network and the virtual network. For example, the size of the IPv4 packet generated by the virtual machine could be limited to a size that can be inserted into an IPv4 packet and leave enough bits so the service provider can add headers to the packet.

Any one or more of the virtual machines 112 within a virtual network 110 may establish a communication flow with a remote node 150. A communication flow includes packets that are transmitted back and forth across network 145 between the virtual machine 112 within the virtual network 110 and the remote node 150. Each communication flow may be between corresponding applications attempting to communicate with one another to perform a coordinated task. As a virtual network 110 may include multiple virtual machines 112, each such virtual machine may establish its own communication flow with the remote node 150. A communication flow may be defined by the combination of source IP address and port number and destination IP address port number.

In the example of FIG. 1, the VPN endpoint node 120 includes a packet aggregator 122 and one or more cryptographic units illustrated as cryptographic unit 124a, 124b, . . . , 124n. Each of the packet aggregator 122 and cryptographic units 124a-n may comprise machine instructions (applications) that are configured to execute within a virtual machine executing on a physical compute device such as a server. The various virtual machines comprising the VPN endpoint node 120 may execute on different servers, or two or more of the virtual machines may execute on the same server. The functionality of each of the cryptographic units 124a-n is to decrypt a packet it receives that has an encrypted payload and to encrypt a packet that it receives in plaintext (i.e., unencrypted) form. The cryptographic units 124a-n thus perform both encryption and decryption functions in support of the network traffic across the secure tunnel 140. In some embodiments, all of the cryptographic units 124a-124n of a given VPN endpoint node 120 are identical in terms of their software load and performance. In other embodiments, however, the cryptographic units may include a mix of different types and sizes of units—some cryptographic units including, for example, more resources such as processors and thus having a higher performance capability than other cryptographic units. In this latter embodiment, cryptographic units with a greater performance capability are capable of encrypting and decrypting more packets per unit of time than lower performance cryptographic units.

The functionality performed by the packet aggregator 122 is process packets being transmitted across the tunnel. The packet aggregator performs different functions depending on the direction of the packet flow. For packets the packet aggregator 122 receives from the remote node 150 (i.e., inbound traffic), the packet aggregator 122 receives such packets, which are encrypted per the security protocol implemented for the tunnel 140. The packet aggregator 122 may perform an anti-replay check on the incoming packets to help guard against a replay attack. In one example, the anti-replay check performed by the packet aggregator 122 defines a replay window, which may be defined as a preconfigured count of packets. Each packet is assigned a monotonically increasing sequence number (described below). As such, packets transmitted back and forth between the VPN endpoint node 120 and the remote node 150 have different (and monotonically increasing) sequence numbers (e.g., 1, 2, 3, 4, etc.). The sequence numbers may comprise sequence numbers within TCP packet headers and/or sequence numbers within ESP packet headers. Absent packet retransmissions, which may occur due to an error occurring during a packet's transmission), different packets should normally not have the same sequence number. A replay attack is a form of network attack in which a valid data transmission is maliciously or fraudulently repeated. The replay window defined by the packet aggregator 122 may compare the sequence number of each incoming packet to the highest sequence number already received. The packet aggregator 122 may reject a packet whose sequence number does not lie within the defined replay window. For example, if the replay window is 5, and the highest received sequence number thus far is 45, the packet aggregator will reject a packet whose sequence number is less than 40.

If the incoming packet survives the replay attack check, the packet aggregator 122 then selects one of the cryptographic units 124a-n. In one embodiment, the packet aggregator may employ a round-robin selection protocol. In another embodiment, the packet aggregator may assess metrics about each of the cryptographic units and select the unit that currently has, for example, the lowest utilization. The packet aggregator may submit a request to an application programming interface (API) to each cryptographic unit to request each such unit to report its current central processing unit (CPU) utilization, memory utilization, etc. Based on the information returned by each cryptographic unit, the packet aggregator 122 makes its selection. The packet aggregator 122 then forwards the incoming packet to the selected cryptographic unit 124a-n. In some embodiments, the packet aggregator may replace the destination address in the packet with the IP address of the selected cryptographic unit 124a-n.

The selected cryptographic unit 124a-n receives the encrypted packet from the packet aggregator as indicated at 125. The cryptographic unit may unpack the encrypted packet to extract the encrypted payload, which itself may be a fully formed packet (i.e., header, payload, etc.). This process also may extract the sequence number from the packet's header (e.g., TCP sequence number, ESP sequence number). As the packet aggregator receives all incoming packets and thus performs the anti-replay check, the cryptographic units 124a-n does not perform this check in at least some embodiments. The cryptographic unit decrypts the encrypted packet payload. The cryptographic unit may use an encryption key supplied to it by the packet aggregator as explained below. The cryptographic unit also may perform the particular cryptographic protocol specified by the packet aggregator, which have resulted from the packet aggregator negotiating security parameters with the remote node when establishing the secure tunnel 140.

After decrypting the packet's encrypted payload to generate a plaintext packet, the cryptographic unit encapsulates the plaintext packet in a tunneling protocol. In some embodiments, the plaintext packet generated by the decryption process may be encapsulated with a preconfigured tunneling header that includes the extracted sequence number in a field within the header, as well as another header to enable the packet to be transmitted to the correct destination IP address. This latter packet may include, for example, an IPv4 header that specifies the tunneling protocol used in the packet.

In some embodiments, the plaintext and tunneled packet is forwarded back to the packet aggregator as indicated at 127. The packet aggregator detunnels the packet received from the cryptographic unit 124a-n to obtain the plaintext packet. The detunneling process may include retrieving and saving the sequence number from the tunneled packet so that the next message sent by the destination virtual machine through the VPN endpoint node may be assigned a sequence number based on the saved sequence number (e.g., the saved sequence incremented by 1).

The amount of time each cryptographic unit 124a-n takes to perform the operations listed above (e.g., unpack a packet, decrypt the encrypted payload, etc.) may vary between the various cryptographic units. A reason for this variability may be the varying number and size of packets being processed by the various cryptographic units. As a result of this throughput variability, packets received by the packet aggregator in a correct order (per the sequence numbers), may end up being forwarded to the packet aggregator in a different order for a given communication flow. Thus, in some embodiments, the packet aggregator 122 may determine if any incoming packets should be reordered before forwarding the packets to the destination virtual machine 112 within the VPN 110. The packet aggregator 122 may include a buffer and may save incoming plaintext messages in the buffer. Before forwarding a packet to the VPN 110, the packet aggregator may access the buffer to determine if, based on the sequence numbers, any buffered packets for a given communication flow should be forwarded to the VPN 110 in a different order from the order that such packets were received from the cryptographic units and saved in the buffer.

Packets that implement the IPSec protocol may have multiple headers including the TCP header and an ESP header, and each header may include a sequence number for that particular protocol. The TCP header includes a source IP address and port number and a destination IP address and port number. As noted above, the source and destination IP address and port numbers may collectively define a communication flow. In one embodiment, the packet aggregator may use the source and destination IP address and port numbers to identify the flow and use the TCP sequence numbers to reorder packets within a given flow. In other embodiments, the aggregator may reorder packets using the ESP headers' sequence numbers. As the ESP sequence numbers are globally unique for the secure tunnel, reordering based on the ESP sequence numbers results in packet ordering without regard to individual communication flows. As each cryptographic unit decrypts a packet and generates the tunneled packet as noted above, the cryptographic unit may include both the TCP and the ESP sequence numbers in the header of the tunneled packet so that the aggregator can use either or both of the sequence numbers for packet reordering.

In some embodiments, the packet aggregator operates according to a packet ordering mode, while in other embodiments, the packet aggregator does not implement the packet ordering mode of operation. The modes of operations may be programmable and may be configured by the customer when creating the VPN endpoint node 120. In some embodiments, the launch request to create the VPN endpoint node may identify a particular reordering mode for the node to implement (e.g., reordering based on TCP sequence number or reordering based on ESP sequence number). In yet another embodiment, the packet aggregator may implement ESP sequence number-based packet reordering by default and without being requested to do so in the launch request, but the launch request may specify whether TPC sequence numbering-based packet reordering is also to be performed by the packet aggregator. In this latter case, the packet aggregator may first perform packet ordering based on the ESP sequence numbers, and then further re-order the packets within individual flows using the TCP sequence numbers of each such flow.

Whether the packets are reordered or not, the packet aggregator 122 forwards each plaintext packet to the destination virtual machine 112 within the VPN 110 designated by the destination IP address within the packet. In some embodiments, the cryptographic units 124a-n may forward their plaintext packets to the VPN 110 and thus bypass the packet aggregator 122. In this embodiment of course, packet ordering is not performed by the packet aggregator.

For outbound traffic (i.e., traffic to be sent from the VPN 110 to the remote node 150), the functions implemented by the packet aggregator 122 and the cryptographic units 124a-n may be as follows. A plaintext packet generated by a given virtual machine 112 within the VPN 110 is transmitted to, and received by, the packet aggregator 122. The packet aggregator then assigns a sequence number to the packet. The sequence numbers are assigned on a communication flow basis. For example, if the virtual machine 112 has generated a response packet to a packet received from the remote node 150 with sequence number X, then the packet aggregator, which previously saved sequence number X as noted above, assigns sequence number X+1 to the newly received plaintext packet from the VPN 110. The packet aggregator also may create a tunneled packet by, for example, encapsulating the plaintext packet with one or more headers as noted above. One of the headers may include the newly assigned sequence number. The packet aggregator selects one of the cryptographic units 124a-n on a round-robin or other basis as explained above, and forward the packet to the selected cryptographic unit 124a—for encryption of the packet.

The selected cryptographic unit receives and detunnels the packet to extract, for example, the sequence number. The cryptographic unit then may encrypt the packet, encapsulate it with a header that includes the sequence number and forwards the packet back to packet aggregator. The packet aggregator replaces the source IP address in the packet (which may have been the IP address of the virtual machine 112 of the VPN 110 that originated the plaintext packet) with the public IP address assigned to the VPN endpoint node for the tunnel 140. The packet aggregator then transmits the encrypted packet to the remote node 150. The packet aggregator also may reorder the outgoing encrypted packets using the packets' ESP sequence numbers.

Referring still to FIG. 1, customers can interact via their own user devices 70 with the virtual machine provisioning service 130 to request the creation of one or more virtual machines such as virtual machines 112 and the virtual machines in which the packet aggregator 122 and cryptographic units 124a-n execute. A user device 70 may comprise any type of computing device such as personal computer, a smart phone, a tablet device, etc. Through the user device 70, a customer can submit requests to the virtual machine provisioning service for various services such as virtual machine creation, VPN endpoint node creation, virtual machine termination, virtual private network creation, connection of a VPN endpoint node to a VPN, etc. The customer may submit API requests via a command line interface (CLI) or a script file, or both. Alternatively, or additionally, a web browser may execute on the user device 70 and the customer may interact with the virtual machine provisioning service 130 via the web browser. The virtual machine provisioning service 130 may be implemented a number of constituent services. One such service may be a user interface which generates hypertext markup language (HTML) web pages which are transmitted across a public such as the Internet (e.g., network 145) to the user device for display thereon. The web browser may display a console interface by which the customer can interact. The virtual machine provisioning service may receive and process API requests from the customers of the service provider and perform the operations indicated by the API requests. For example, the virtual machine provisioning service may perform a workflow to launch virtual machines on host computers, launch the virtual machines to implement the VPN endpoint node described herein, etc.

For example, in response to receiving an API request to create the VPN endpoint node 120, the virtual machine provisioning service 130 may select multiple host computers operating within the provider network 100 and causes a virtual machine to be launched on each such host. In one embodiment, one host computer is selected on which to launch a virtual machine to execute an application that performs the functions described herein for the packet aggregator 122, and other hosts are selected for execution of additional virtual machines in which applications execute that perform the functionality of the cryptographic units 124a-n.

The API request to create the VPN endpoint node may include, among other input parameters, a parameter that is indicative of the number of cryptographic units to implement for the PVN endpoint node 120. In some implementations, the parameter may include an integer number corresponding to a desired number of cryptographic units. In other implementations, the parameter may indicate an expected data rate of packet traffic through the VPN endpoint node (e.g., a specified number of gigabits per second). The virtual machine provisioning service 130 selects a number of host computers to use host the cryptographic units based on the parameter in the API request. In the latter example, in which the parameter is indicative of a data rate, the virtual machine provisioning service may map the parameter to the number of host servers. For example, for data rates under 5 Gbps, the virtual machine provisioning service 130 may be preconfigured (or through a look-up) to determine that two cryptographic units are to be implemented for the VPN endpoint node 120, and that for 10 Gbps, four cryptographic units are needed.

In some embodiments, the API request may include a parameter that instructs the virtual machine provisioning service 130 to auto-scale the cryptographic layer of the VPN endpoint node. That is, the number of cryptographic units included as part of the VPN endpoint node may be dynamically changed during run-time of the VPN endpoint node. The virtual machine provisioning service 130 then may create the VPN endpoint node to include an appropriate number of cryptographic units 124a-n given, for example, the data rate indicator in the API request. The virtual machine provisioning service 130 also may periodically monitor, for example, workload capacities of the cryptographic units (e.g., CPU utilizations, memory utilizations, etc.) and add or remove cryptographic units as needed. If the virtual machine provisioning service 130 decides to add a cryptographic unit to the existing set of cryptographic units, the virtual machine provisioning service 130 may select another host computer and initiate the process for loading an appropriate machine image for a cryptographic unit onto the newly selected host computer. The provisioning service may send an API request to the packet aggregator of the VPN endpoint node that a new virtual machine (cryptographic unit) has been launched and the packet aggregator may configure the newly provisioned cryptographic unit to include the security key currently in use by the other cryptographic units of the VPN endpoint node. The packet aggregator may require a positive acknowledgment from the newly launched cryptographic unit of receipt of the security key. Failure to receive the acknowledgment may prompt the packet aggregator to request that the provisioning service terminates the newly launched virtual machine. As such, as the amount of traffic through the customer's secure tunnel changes, the number of cryptographic units may automatically change as well without necessitating a disruption in traffic. In addition to adding a cryptographic unit, an API call may be made by the provisioning service to the packet aggregator 122 (or south and north aggregators 160, 170) to provide an update to the packet aggregator as to the number and IP addresses of the cryptographic units to which the aggregator has access.

In another embodiment, the API request to create the VPN endpoint node may specify as an input parameter periods of time in which the number of cryptographic units should be changed. For example, the customer may know that traffic levels are higher during normal business hours and lighter at night. The customer then can create the VPN endpoint for a certain number of cryptographic units from 8 am to 6 pm, and a different (e.g., smaller) number from 6 pm to 8 am.

In yet another embodiment, while the customer's VPN endpoint node is operational, the customer can submit an API request to the virtual machine provisioning service 130 (or other service within the provider network) to manually alter the number of cryptographic units deployed into the VPN endpoint node. As an input parameter, this API request may include the number of cryptographic units that the customer wants for the node, or a value that indicates the number of cryptographic units to add or remove from the existing cryptographic units.

Once the host computers to implement the VPN endpoint node 120 are selected, the virtual machine provisioning service 130 causes the virtual machines to be launched on the selected host computers. In one embodiment, launching a virtual machine may include causing a particular machine image to be retrieved from a machine image storage (not shown) and transmitted to the selected host computer. The machine image may include an operating system, drivers, and an application configured to implement the some of the VPN endpoint functionality such as the packet aggregator 120 or the cryptographic unit 12a-n. Two different machine images may be used to implement the VPN endpoint node 120. One machine image may include an application that performs the functionality described herein attributed to the packet aggregator, and another machine image may include an application that performs the functionality described herein attributed to the cryptographic unit. The appropriate machine image is transmitted to and loaded onto a storage drive of the host computers. The machine images may be stored in a centralized database within the provider network. Each machine image, including the VPN endpoint-based images as well as other types of machine images usable by customers to launch other types of virtual machines may have pre-assigned identifiers (IDs). The IDs may be used by the provisioning service to launch a virtual machine as a VPN endpoint node. The provisioning service selects the machine image to copy to the host computer for launching the VPN endpoint virtual machine using the ID associated with the machine image needed to implement the VPN endpoint node functionality.

In embodiments in which all of the cryptographic units 124 of a customer's VPN endpoint node are substantially identical, copies of the same machine image may be provided to identically configured host computers. Each such cryptographic unit in that embodiment is generally capable of the same or similar performance in terms of the number of packets that each unit can encrypt and/or decrypt per unit of time.

In other embodiments, the VPN endpoint node may be implemented with a mix of virtual machines implementing the cryptographic units. One or more cryptographic units may be implemented, for example, with virtual machines that have N processors while one or more other cryptographic units may be implemented with virtual machines that have M processors, where N is greater than M. For example, one or more virtual machines may have 8 processors, while one or more other virtual machines have four processors. The aggregator is configured with the size and/or performance capabilities of the virtual machines that comprise the cryptographic units. The aggregator thus may load balance the packets to be decrypted and/or encrypted across the cryptographic units based on the performance capabilities of the various cryptographic units. For example, the aggregator may weight more heavily a cryptographic unit that is capable of higher performance and thus distribute more packets to that unit than another cryptographic unit that has a lower performance level.

For the virtual machine configured to perform the packet aggregator, the application contained in the corresponding machine image performs a number of functions as described herein as well as creating and managing the secure tunnel 140. Such operations depend on the particular protocols used to implement the tunnel 140. In the case of using IPSec to implement the tunnel, the operations performed by the packet aggregator virtual machine may include authenticating the remote node based on a pre-shared key, exchanging certificates, generating a Diffie-Hellman key, generating an IPSec key, negotiating security protocols and key lifetimes with the remote node, renegotiating a security association (including keys), etc. The application executing within the packet aggregator virtual machine may implement a pair of opposite direction communication paths (send and receive) to form the tunnel 140.

After the packet aggregator and cryptographic unit machine images are loaded on their respective host computers, the virtual machine provisioning service 130 also may cause configuration parameters to be downloaded into the host computers for use by the respective virtual machines. Some of the configuration parameters may originate from the customer's initial API request for creating the VPN endpoint node, while other configuration parameters may be stored in a centralized database or otherwise generated by the virtual machine provisioning service 130 or other services within the provider network 100.

For the packet aggregator virtual machine, the configuration parameters may include any one or more of a remote IP address, a remote pre-shared key (PSK), a tunnel inside IP classless inter-domain routing (CIDR) block of addresses, a remote Border Gateway Protocol (BGP) Autonomous System (AS) number (in embodiments in which BGP is implemented), and a local BGP AS number. The remote IP address is the public IP address of the remote node 150 to which the customer's VPN endpoint node 120 is to form a tunnel 140 over which encrypted traffic will flow between the customer's virtual private network 100 and any network(s) coupled to the remote node 150. The remote pre-shared key is a key that is preconfigured into the VPN endpoint node 120 and the remote node 150, and is used as part of a tunneling protocol such as the IPSec protocol to authenticate each end node of the tunnel to the its peer attempting to form an IPSec tunnel. The tunnel inside IP CIDR block may comprise a plurality of IP addresses used to establish connectivity of the VPN endpoint node within the provider network. One of the IP addresses in the CIDR block is the IP address of the VPN endpoint node 120 and another IP address is the IP address of the remote node 150. The remote and local BGP AS numbers designate the particular autonomous systems that the VPN endpoint node 120 and its remote peer counterpart should use when establishing the tunnel therebetween.

The customer also configures the remote node 150 with parameters it needs to help establish the secure tunnel 140 to the VPN endpoint node 120. For example, the customer may configure the remote node 150 with the public IP address assigned to the VPN endpoint node 120, the type of security protocol(s) supported by the VPN endpoint node (e.g., Authentication Headers (AH), Encapsulating Security Payloads (ESP), etc.), type of encryption algorithm to be used, the pre-shared key, etc.

The virtual machines that implement the packet aggregator 122 may be configured to include the IP addresses of the various cryptographic units 124, and the virtual machines that implement the cryptographic units 124 may be configured to include the IP address of the packet aggregator to facilitate communications between these nodes as described herein. Further, as noted above, the packet aggregator may be configured for a packet reordering mode of operation (or no packet reordering) and that configuration parameter also may be provided to the virtual machine hosting the packet aggregator application. This configuration parameter may be part of the original machine image used to launch the virtual machine, or the configuration parameter may be downloaded to the virtual machine separately.

The virtual machine provisioning service 130 can also be accessed by customers through the use of the user devices 70 to launch virtual machines 112 for hosting customer-specific applications (e.g., web applications, batch processing applications, etc.). Further, as noted above, a customer can group one or more virtual machines 112 into a VPN 110. The customer may generate or cause to be generated API requests to the virtual machine provisioning service to perform these operations.

Figure 2:
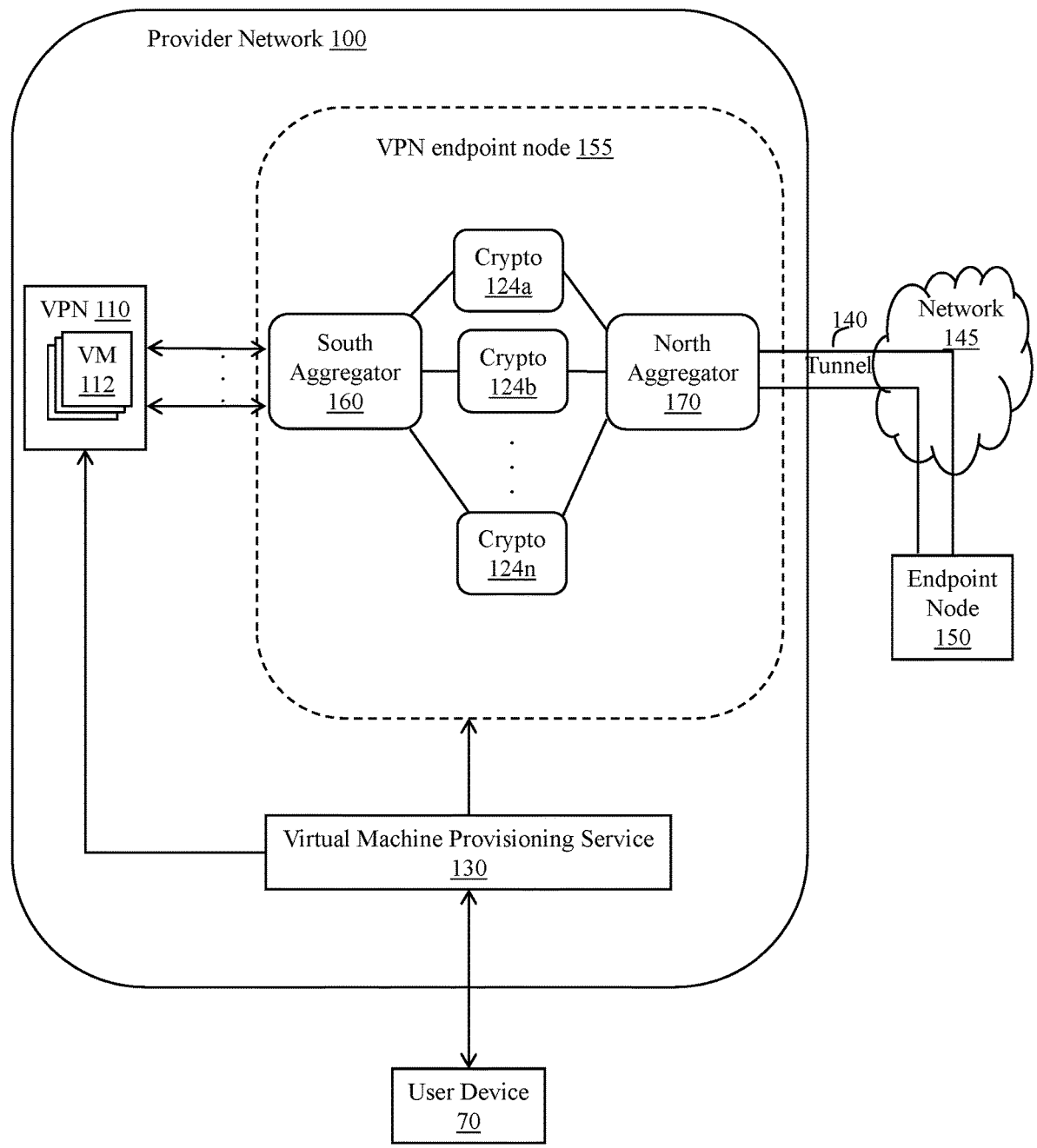
FIG. 2 shows an alternative embodiment of the system in which the packet aggregator is implemented as separate functional components in accordance with various examples.

FIG. 2 shows another embodiment of a VPN endpoint node. As for FIG. 1, FIG. 2 illustrates a provider network 100 that includes one or more customer VPNs 110 and associated VPN endpoint nodes which are configured to establish a secure tunnel to an endpoint node 150. The VPN endpoint node 155 in FIG. 2 however, is different than in FIG. 1 in that the packet aggregator 122 of FIG. 1 is implemented as two separate aggregator components—a south aggregator 160 and a north aggregator 170 (the terms "south" and "north" are only intended to aid in readability and do not indicate any particular physical location or functionality). The south aggregator 160 includes interfaces to the customer VPN 110 and the north aggregator has an interface to the secure tunnel 140. The cryptographic units 124*a-n* are coupled between the south and north aggregators as shown.

Figure 3:
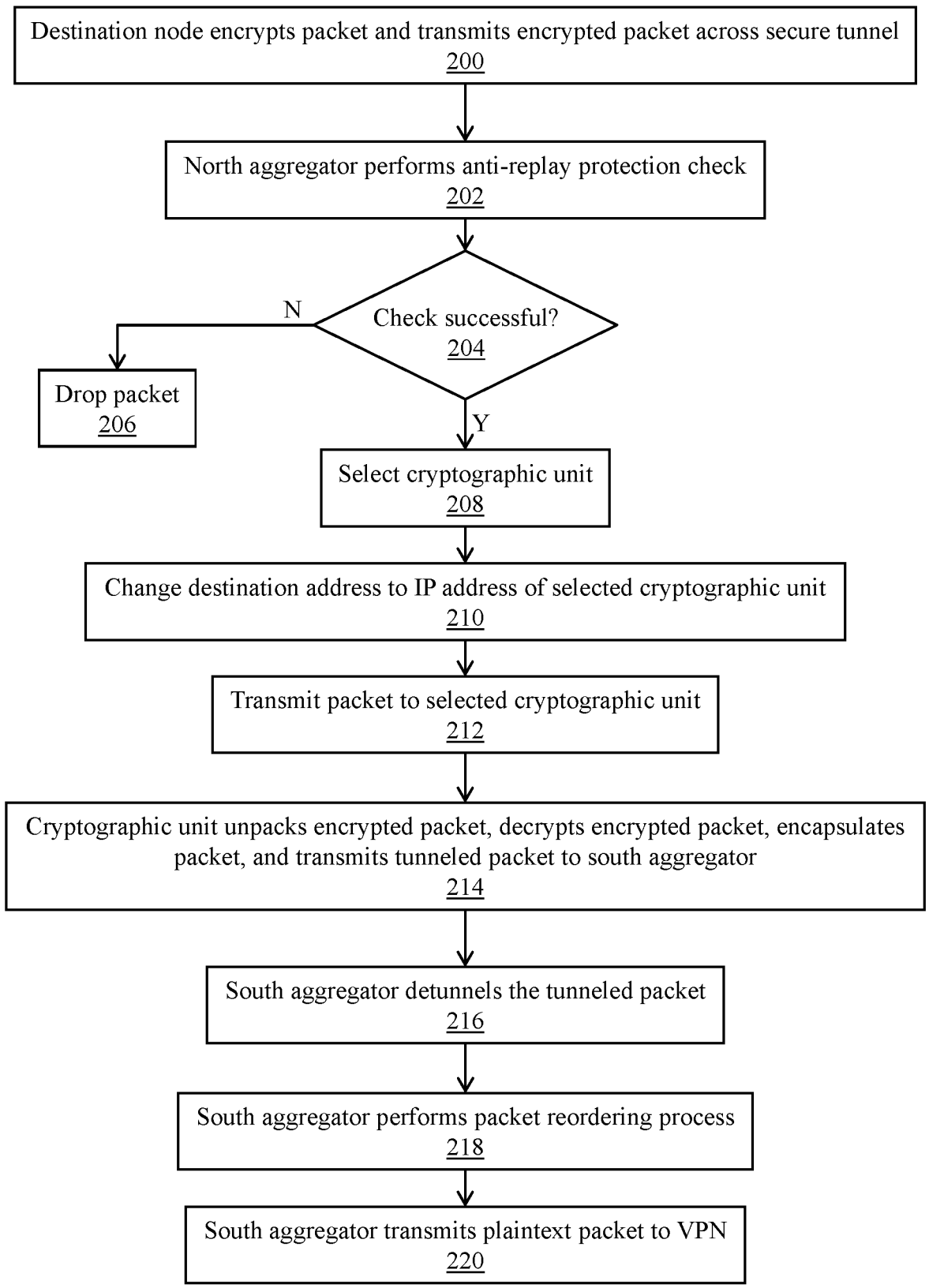
FIG. 3 shows a method for processing encrypted packets from a remote node by the virtual private network endpoint node in accordance with various examples.
Figure 4:
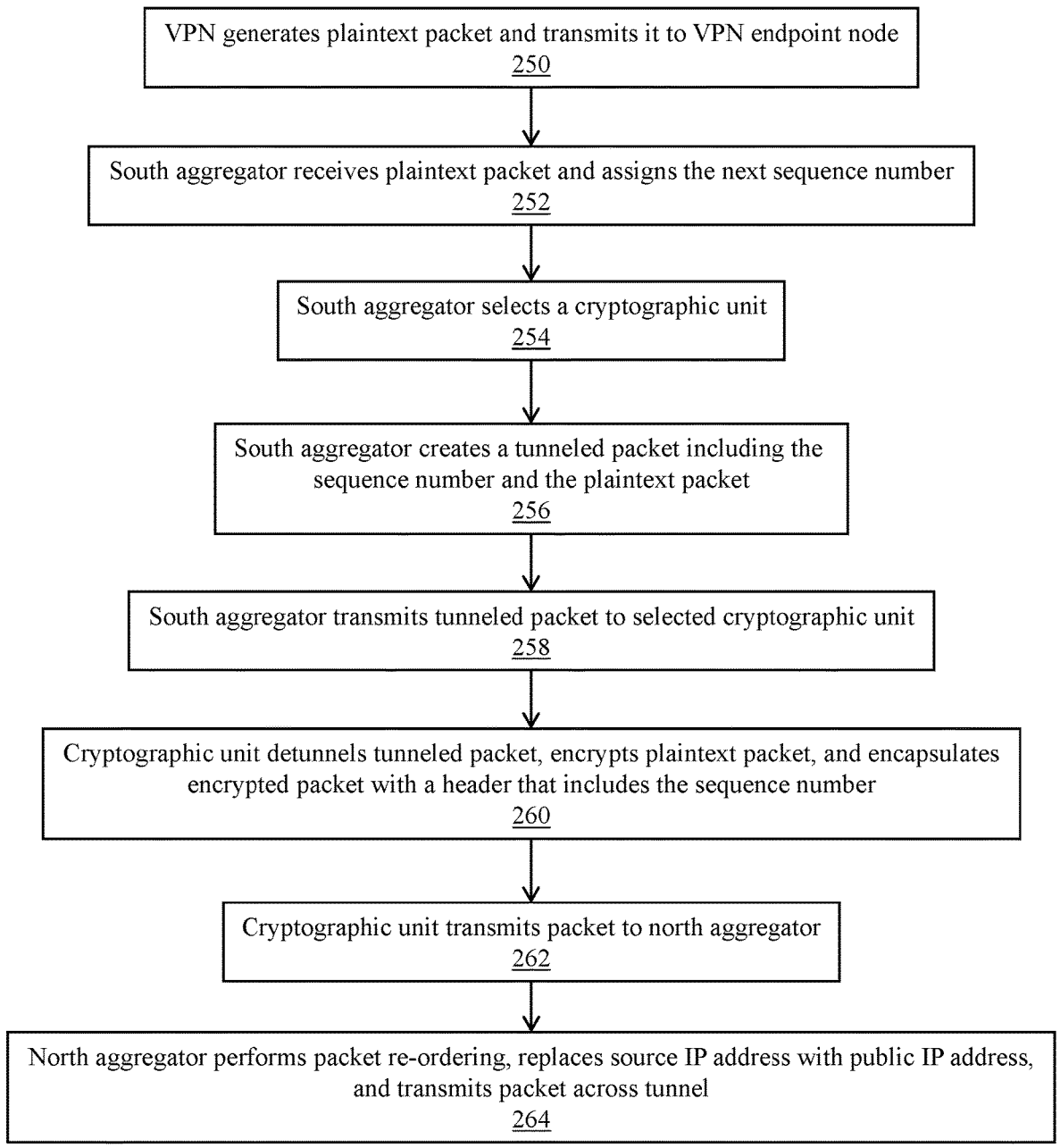
FIG. 4 shows a method for processing outgoing plaintext packets by the virtual private network endpoint node.

FIGS. 3 and 4 include flow charts illustrating methods in accordance with various embodiments. The methods illustrated in FIGS. 3 and 4 reference the north and south aggregators and thus are discussed below with reference to FIG. 2. The operations shown in FIGS. 3 and 4 may be performed in the order shown, or in a different order. Further, the operations may be performed serially, or two or more of the operations may be performed sequentially.

Referring now to FIG. 3, the method includes at 200 a destination network that is, or is coupled to, the remote node 150 generating and encrypting a packet destined for a virtual machine 112 within the customer's VPN 110 and transmitting the encrypted packet across the secure tunnel 140. As its destination IP address, the packet may be configured to include the public IP address of the VPN endpoint node 155, previously configured into the remote node.

Upon receipt by the north aggregator 170, the north aggregator performs an anti-replay protection check at 202. An example of an anti-replay check is described and generally includes rejecting an incoming packet whose sequence identifier is outside of a defined replay window. The replay window is configured to be a certain range of sequence numbers relative to the highest sequence number received of a valid, non-rejected packet. Other anti-replay techniques may be employed as well by the north aggregator.

At 204, if anti-replay check performed by the north aggregator is unsuccessful (i.e., the packet is determined to possibly be part of a replay attack), then the packet is dropped at 206. Dropping the packet may include not forwarding the packet on to a cryptographic unit 124a-n and not generating any type of acknowledgement or other type of packet to be sent back to the remote node. Dropping a packet may also include generating a security alert to a security monitoring service within the provider network.

If, however, the anti-replay check is successful (i.e., the packet is not determined to be part of a replay attack), then at 208 the method may include selecting a cryptographic unit 124a-n. As noted above, cryptographic unit selection may be based on any of a number of parameters or techniques including, for example, round-robin selection, workloads of the various cryptographic units, etc. Selection of the cryptographic unit may include the north aggregator accessing a configuration data to retrieve the IP address of the selected cryptographic unit. At 210, the north aggregator may change the destination IP address in the packet to the IP address of the selected cryptographic unit and then at 212, the north aggregator transmits the incoming encrypted packet to the selected cryptographic unit.

At 214, the cryptographic unit receives the encrypted packet, unpacks the encrypted packet, decrypts the payload in the packet, encapsulates the resulting plaintext packet to create a tunneled packet, and transmits the tunneled packet to the south aggregator 160. Unpacking the encrypted packet includes stripping off the header of the encrypted packet and saving the sequence identifier, destination IP address and possibly other information included in the header. The payload of the packet is then decrypted. The cryptographic unit decrypts the packet using an encryption key and other information about the decryption process (e.g., the encryption/decryption algorithm to use) as specified, for example, by the north aggregator as a result of the north aggregator negotiating a security association with the remote node. Once the payload is decrypted, the cryptographic unit may add headers to the packet to create a tunneled packet. The destination IP address in the newly formed tunneled packet may be the IP address of the south aggregator (which was previously configured into the cryptographic units) and the sequence identifier is included in the tunnel as explained above.

The south aggregator 160 receives the tunneled packet and detunnels the packet at 216. This process may include removing the tunnel header and reheadering the packet for transmission to the customer's VPN 110. The south aggregator also may perform packet reordering (218), a process which may include buffering packets of a given communication flow before transmitting them to the corresponding VPN virtual machine 112 and reordering the packets to be closer sequence identifier order. At 220, the method includes the south aggregator transmitting the plaintext packet to the target virtual machine 112 of the virtual private network 110.

In FIG. 4 the method depicts an illustrative embodiment for how the VPN endpoint node processes outgoing packets, that is, packets generated by the VPN 110 and destined for the remote node 150 via secure tunnel 140. At 250, the method includes generating, for example by a virtual machine 112 within the VPN 110, a plaintext packet and transmitting the packet to the VPN endpoint node attached to that particular VPN. In some embodiments, a routing table may be included within or accessible to each virtual machine 112 that maps packets destined the IP address of the remote node to be transmitted to the VPN endpoint node (e.g., to the south aggregator 160). At 252, the method includes the south aggregator receiving the plaintext packet and assigning a sequence number to the packet. The sequence number may the previous sequence number of a packet to which the currently processed packet is responding that has been incremented by the south aggregator.

At 254, the method includes the south aggregator selecting a cryptographic unit 124a-n to encrypt the packet. As explained previously, the selection of cryptographic units may be made on any suitable basis such as round-robin, workload, etc. At 256, the method creating a tunneled packet by, for example, the south aggregator. In some embodiments, the tunneled packet includes the plaintext packet to which additional headers are added. One of the headers may include the newly assigned sequence number and that, or another, header may include the IP address of the selected cryptographic unit in accordance with the virtual network addressing explained above.

At 258, the method includes the south aggregator transmitting the tunneled packet to the selected cryptographic unit, which then detunnels the packet as explained previously and saves the packet's sequence number. The cryptographic unit also encrypts the plaintext packet extracted from the tunneled packet using the encryption key previously provided by the north aggregator. The encrypted packet is then encapsulated with a header that includes the sequence number. The packet is then transmitted to the north aggregator at 262 by the cryptographic unit and the north aggregator, at 264, replaces the source IP address of the packet with the public IP address of the tunnel and transmits the packet across the tunnel to the remote node 150. Operation 264 also may include packet reordering. The north aggregator, for example, may use the encrypted packet's ESP sequence numbers to reorder the packets, that is, transmit the encrypted packets across the tunnel in ESP sequence number order.

In some embodiments such as those described herein, the tunnel is a secure tunnel over which encrypted packets are transmitted. The encryption and decryption of the packets may be part of the security protocol used to implement the secure tunnel 140. In some security protocols, such as IPSec, the security keys may be regenerated on a configurable periodic basis, on demand, or in accordance with other criteria. The encryption keys used to encrypt and decrypt packets may be generated as part of negotiation process between the VPN endpoint node and the remote node. Any newly generated encryption is distributed to the various cryptographic units for their use in performing the cryptographic functions.

Figure 5:
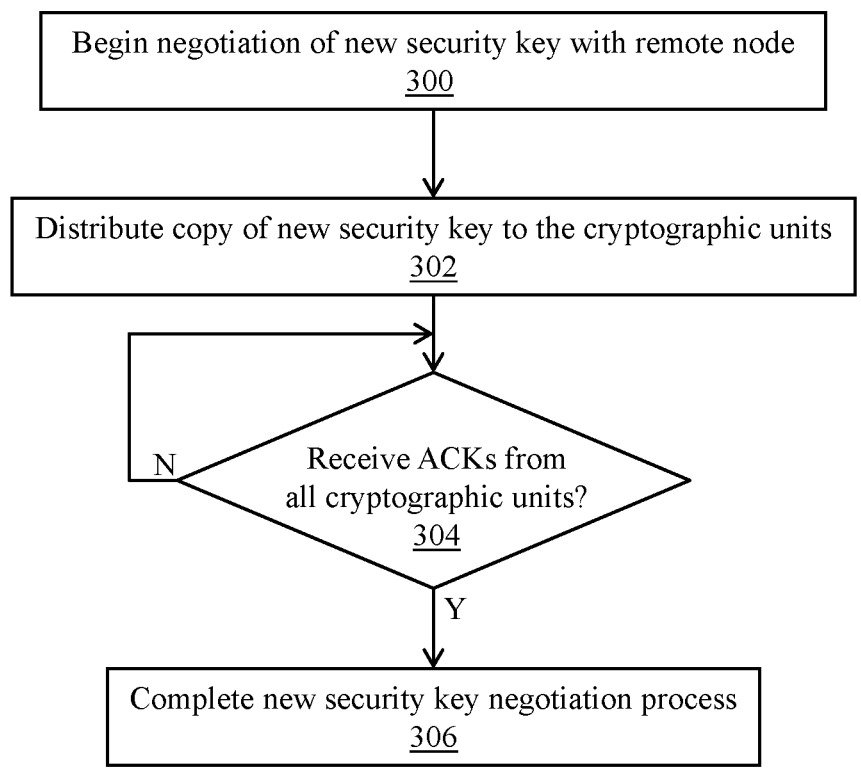
FIG. 5 illustrates a method for changing security keys by the packet aggregator and providing the updated keys to the cryptographic units.

FIG. 5 illustrates one suitable technique for the "rekeying" process. At 300, the method may include beginning the negotiation process for generating a new security key. Either the remote node 150 or the VPN endpoint node (e.g., the aggregator 122 of FIG. 1 or north aggregator 170 of FIG. 2) may initiate the re-keying process. In the example of IPSec, the Diffie-Hellman key is used to compute the IPSec key, which is the key that is actually used to encrypt packets transmitted across the tunnel. The process of computing a new IPSec key may involve multiple operational steps between the nodes and may culminate with a suitable handshake acknowledgment packet to signify the end of the rekey operation. If the VPN endpoint node is to generate this acknowledgment packet, the VPN endpoint node may hold off transmitting this packet to the remote until all of the cryptographic units have been given a copy of the newly computed IPSec key (302). In one embodiment, the packet aggregator 122 (or north aggregator 170) sends a message (e.g., an API call) to each cryptographic unit to provide the new IPSec key (e.g., as a parameter to the API call). In other embodiment, the packet aggregator 122 (or north aggregator 170) stores a copy of the newly generated IPSec in a storage repository, and then sends a signal or message to each cryptographic unit that a new IPSec key is available in the storage repository. The cryptographic units then access the storage repository to obtain a copy of the new key. Either way, each cryptographic unit submits an acknowledgment packet to the packet aggregator 122 (or north aggregator 170), either directly or through the storage repository, and the packet aggregator 122 (or north aggregator 170) transits the handshake acknowledgment packet to the remote node 150 to complete the rekeying operation (306) after determining (304) that all of the cryptographic units that are part of the VPN endpoint node have successfully reported that they have received the new key.

Figure 6:
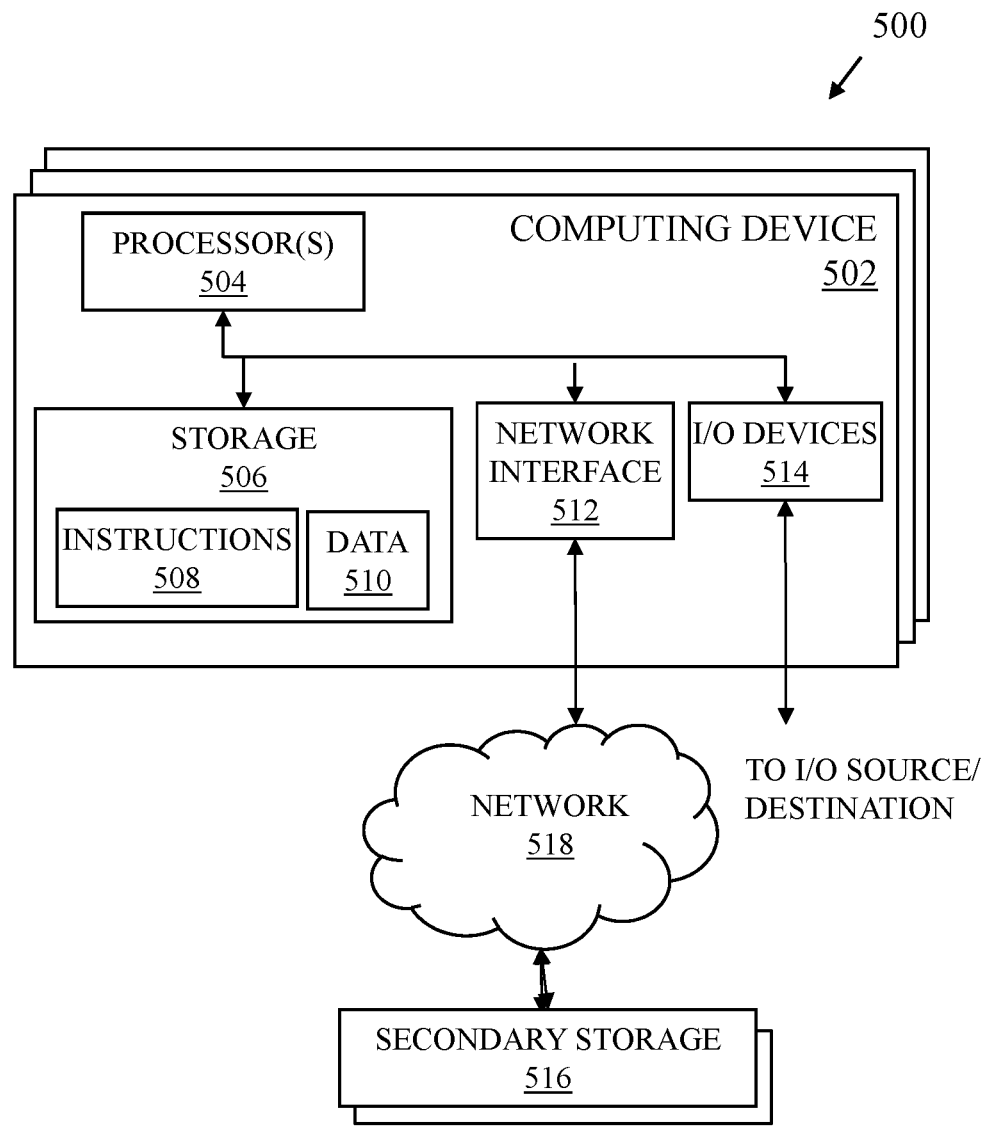
FIG. 6 is a block diagram of a compute device in accordance with various examples.

FIG. 6 shows a schematic diagram for a computing system 500 suitable for implementation of any of the virtual machines (e.g., virtual machines 112 and the virtual machines of the VPN endpoint nodes), the packet aggregator 122, the north and south aggregators 160, 170, the cryptographic units 124*a-n*, and the virtual machine provisioning service 130 as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various services described herein.

Each computing device 502 includes one or more processors 504 coupled to a storage device 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA, Similarly, in a distributed computing system such as one that collectively implements the provider network 100, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processor(s) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the virtual machines, packet aggregator 122, north and south aggregators 160, 170, cryptographic units 124*a-n*, and virtual machine provisioning service 130 and other components described herein may be implemented as a separate computing device 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANS, or via any other suitable type of network and/or protocol.

Input/output devices 514 may include one or more display terminals, keyboards, keypads, touchpads, mice, scanning devices; voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
a plurality of compute devices, wherein each compute device includes one or more processors and memory, and each compute device is configured to implement at least one of a plurality of virtual machines, and wherein each virtual machine of the plurality of virtual machines is configured to use at least one processor within a respective compute device of the plurality of compute devices to execute a cryptographic application, and one or more virtual machines of the plurality of virtual machines is configured to use at least one processor within the respective compute device to execute a packet aggregator;
wherein the packet aggregator is configured to distribute incoming encrypted packets from a secure tunnel across the plurality of virtual machines configured to execute cryptographic applications, to change an encryption key used for the secure tunnel, to perform an anti-replay check on the incoming encrypted packets from the secure tunnel, and to reorder a plurality of the incoming encrypted packets after such packets have been decrypted;
wherein each cryptographic application is configured to decrypt incoming encrypted packets from the packet aggregator and to encrypt outgoing plaintext packets for transmission across the secure tunnel; and
wherein the packet aggregator is configured to assign a sequence number to an outgoing plaintext packet, create a tunneled packet including the sequence number in a header of the tunneled packet and including the plaintext packet in tunneled packet, select one of the virtual machines executing a cryptographic application, and forward the tunneled packet to the selected virtual machine.

2. The system of claim 1, wherein:
the packet aggregator comprises a first packet aggregation application executing within one of the one or more virtual machines and a second packet aggregation application executing within another of the one or more virtual machines;
the first packet aggregation application is configured to assign the sequence numbers to the outgoing plaintext packets and, for the incoming encrypted packets that have been decrypted by the cryptographic applications, to reorder the plurality of the decrypted packets; and
the second packet aggregation application is configured to change the encryption key used for the secure tunnel, perform the anti-replay check on the incoming encrypted packets from the secure tunnel, and to reject an incoming encrypted packet that fails the anti-replay check.

3. The system of claim 1, wherein the packet aggregator is configured to negotiate a replacement security key with a remote node over the secure tunnel, and cause the replacement security key to be distributed to each of the cryptographic applications.

4. The system of claim 1, further comprising one or more compute devices configured to execute a virtual machine provisioning service, wherein the virtual machine provisioning service is configured to select a number of compute devices to a launch node comprising the packet aggregator and the cryptographic applications, wherein the number of compute devices selected for launching the node being determined by the virtual machine provisioning service using a value in a launch request.

5. The system of claim 4, wherein the value in the launch request is indicative of a data rate through the node.

6. The system of claim 1, further comprising one or more compute devices configured to execute a virtual machine provisioning service, wherein the virtual machine provisioning service is configured to alter the number of compute devices that execute virtual machines for cryptographic applications based on a dynamically determined utilization of the cryptographic applications.

7. A system, comprising:
a plurality of compute devices, wherein each compute device includes one or more processors and memory, and each compute device is configured to implement at least one of a plurality of virtual machines, and wherein each virtual machine of the plurality of virtual machines is configured to use at least one processor within a respective compute device of the plurality of compute devices to execute a cryptographic application, and one or more virtual machines of the plurality of virtual machines is configured to use at least one processor within the respective compute device to execute a first packet aggregator application and a second packet aggregator application;
wherein the first packet aggregator application is configured to assign a sequence number to an outgoing plaintext packet, create a tunneled packet including the sequence number in a header of the tunneled packet and including the plaintext packet in tunneled packet, select one of the virtual machines executing a cryptographic application, and forward the tunneled packet to the selected virtual machine executing a cryptographic application;
wherein the selected virtual machine executing the cryptographic application is configured to encrypt at least a portion of the tunneled packet;
wherein the second packet aggregator application is configured to (a) receive encrypted packets from the virtual machines executing the cryptographic applications and to transmit the encrypted packets over a secure tunnel, (b) negotiate a new encryption key with a remote node over the secure tunnel and cause the new encryption key to be distributed to the virtual machines executing the cryptographic applications, and (c) complete a process for negotiating the new encryption key with the remote node upon receipt of acknowledgments indicating that all cryptographic applications have received the new encryption key.

8. The system of claim 7, wherein the first packet aggregator application is configured to select the virtual machine that executes the cryptographic application on a round-robin basis.

9. The system of claim 7, wherein the second packet aggregator application is configured to distribute incoming encrypted packets from the secure tunnel across the plurality of virtual machines configured to execute the cryptographic applications.

10. The system of claim 9, wherein for each of a plurality of incoming encrypted packets, the second packet aggregator application is configured to select, on a round-robin basis, one of the virtual machines executing the cryptographic applications and distribute the incoming encrypted packet to the selected virtual machine.

11. The system of claim 9, wherein the first packet aggregator application is configured to buffer decrypted packets from the cryptographic units and forward the buffered decrypted packets to a destination node in a different order than the order the packets were buffered.

12. The system of claim 7, wherein for each of a plurality of incoming encrypted packets, the second packet aggregator is configured to perform an anti-replay check instead of any of the cryptographic applications.

13. The system of claim 7, wherein:
for incoming encrypted packets that have been decrypted by the cryptographic applications, the second packet aggregator application is configured to reorder a plurality of the decrypted packets.

14. The system of claim 7, further comprising one or more compute devices configured to execute a provisioning service, the provisioning service is configured to dynamically alter the number of virtual machines executing cryptographic applications through a determination of a current workflow utilization of the cryptographic applications.

15. A method, comprising:
creating a plurality of cryptographic units as virtual machines on separate host computers, each such virtual machine including an executable cryptographic application;
receiving a plurality of encrypted packets for a given communication flow;
for each encrypted packet, selecting from the plurality of cryptographic units, a cryptographic unit to decrypt the corresponding encrypted packet;
transmitting each of the encrypted packets to a corresponding selected cryptographic unit;
decrypting each of the cryptographic packet to generate plaintext packets;
reordering the plaintext packets using sequence numbers included in headers of the plaintext packets;
forwarding the reordered plaintext packets to a virtual machine executing within a provider network;
detecting an increase in the amount of traffic through a virtual machine of the virtual machines that include the executable cryptographic applications;
dynamically creating a new virtual machine that includes the executable cryptographic application;
initiating a re-keying process for generating a new encryption key;
distributing the new encryption key to each of the plurality of cryptographic units;
receiving an acknowledgment that the new encryption key is received from each of the plurality of cryptographic units; and
completing the re-keying process.

16. The method of claim 15, wherein reordering the plaintext packets includes:
identifying a communication flow using packets' source and destination IP addresses and port numbers; and
reordering packets with each identified communication flow using a transmission control protocol sequence number.

17. The method of claim 15, wherein reordering the plaintext packets includes reordering packets using an encapsulation security payload sequence number.

18. The method of claim 15, further comprising:
for each of a plurality of plaintext packets destined for a remote node over a secure tunnel;
selecting from the plurality of cryptographic units, a cryptographic unit to encrypt the plaintext packet;
transmitting the plaintext packets to the selected cryptographic units;
encrypting the cryptographic packets to generate encrypted packets;
re-ordering the encrypted packets using sequence numbers included in headers of the encrypted packets to; and
forwarding the re-ordered encrypted packets across the secure tunnel.

* * * * *